US009828526B2

(12) United States Patent
Evdokimov et al.

(10) Patent No.: US 9,828,526 B2
(45) Date of Patent: Nov. 28, 2017

(54) METHOD FOR PURIFICATION OF ROSIN

(71) Applicant: Arizona Chemical Company, LLC, Jacksonville, FL (US)

(72) Inventors: Andrey Nikolaevich Evdokimov, Saint Petersburg (RU); Larisa Mikhailovna Popova, Saint Petersburg (RU); Alexander Vyacheslavovich Kurzin, Saint Petersburg (RU); Alyona Dmitrievna Trifonova, Derevnya Novoye Devy (RU); Godfried Buisman, Savannah, GA (US)

(73) Assignee: Kraton Chemical, LLC, Jacksonville, FL (US)

( * ) Notice: Subject to any disclaimer, the term of this patent is extended or adjusted under 35 U.S.C. 154(b) by 5 days.

(21) Appl. No.: 14/655,172

(22) PCT Filed: Dec. 20, 2013

(86) PCT No.: PCT/EP2013/077585
§ 371 (c)(1),
(2) Date: Jun. 24, 2015

(87) PCT Pub. No.: WO2014/102168
PCT Pub. Date: Jul. 3, 2014

(65) Prior Publication Data
US 2016/0194523 A1    Jul. 7, 2016

(30) Foreign Application Priority Data

Dec. 25, 2012  (RU) .................... 2012156450
Jul. 3, 2013   (EP) ..................... 13174864

(51) Int. Cl.
*C09F 1/02* (2006.01)
*C09F 1/04* (2006.01)

(52) U.S. Cl.
CPC . *C09F 1/02* (2013.01); *C09F 1/04* (2013.01)

(58) Field of Classification Search
CPC ....................................... C09F 1/02
See application file for complete search history.

(56) References Cited

U.S. PATENT DOCUMENTS

| | | | | | |
|---|---|---|---|---|---|
| 2,111,259 | A | * | 3/1938 | Blengsli | D21C 11/0007 203/31 |
| 2,397,389 | A | * | 3/1946 | Vincent | C09F 1/02 106/218 |
| 3,489,740 | A | | 1/1970 | Cholet | |
| 3,551,404 | A | * | 12/1970 | Watkins, Jr. | C09F 1/02 530/205 |
| 3,655,635 | A | * | 4/1972 | Sanderson | C09F 1/02 530/228 |
| 4,025,479 | A | * | 5/1977 | Jung | C08C 19/00 525/54.44 |
| 4,643,847 | A | * | 2/1987 | Sanderson | C09F 1/02 530/218 |
| 4,847,010 | A | * | 7/1989 | Maeda | C09F 1/04 530/216 |
| 4,906,733 | A | * | 3/1990 | Kodama | C09F 1/04 530/216 |
| 4,962,186 | A | * | 10/1990 | Johnson, Jr. | C09F 1/00 530/215 |
| 5,132,399 | A | * | 7/1992 | MacDonald | C11B 13/005 530/205 |
| 5,395,920 | A | | 3/1995 | Maeda et al. | |
| 5,543,110 | A | * | 8/1996 | Starr | A61L 9/015 162/51 |
| 5,830,992 | A | * | 11/1998 | Whalen | C09F 1/04 530/210 |
| 6,087,318 | A | * | 7/2000 | Jadhav | C09F 1/04 252/367.1 |
| 6,503,971 | B1 | * | 1/2003 | Shah | C08L 33/02 106/311 |

FOREIGN PATENT DOCUMENTS

DE    694142    7/1940

* cited by examiner

*Primary Examiner* — Liam J Heincer

(57) ABSTRACT

The instant invention relates to a method for purifying a rosin-containing material from sulfur compounds. In particular the method comprises a) contacting a rosin-containing material comprising rosin and sulfur compounds with an oxidizing agent at a temperature from 0 to 60° C. for 10 minutes to 3 hours, to oxidize at least part of the sulfur compounds; and b) separating the rosin from the oxidized sulfur compounds; to obtain a purified rosin-containing material. The invention also relates to the purified rosin-containing materials, the preparation of products derived therefrom and the use of the purified rosin-containing materials and derived products.

14 Claims, No Drawings

METHOD FOR PURIFICATION OF ROSIN

Our invention relates to a method for removing the amount of sulfur compounds in a rosin-containing material, including tall oil rosins. The invention also relates to rosin-containing materials that were purified using our method, the preparation of products derived therefrom, the derived products and the use of the purified rosin-containing materials and derived products.

Rosin is a hydrocarbon secretion of many plants, particularly coniferous trees such as *Pinus palustris, Pinus sylvestris*, and *Pinus caribaea*, which consists mainly of resin acids. Rosin-containing materials, including tall oil rosins (TOR) may be obtained as one of the by-products of what is known as the Kraft wood pulping process. Kraft wood pulping is the pre-dominant process used in the pulp and paper industry, wherein wood chips are subjected to digestion in a pulping liquor at an elevated pressure and temperature. The pulping liquor (also known as white liquor) mainly consists of an aqueous solution of sodium hydroxide (NaOH) and sodium sulfide ($Na_2S$). With this process cellulose and lignin are liberated and fatty acids and resin acids are changed into water-soluble soaps. The resulting solution is known as black liquor.

The black liquor is concentrated (e.g. at reduced pressure) and treated with sulfuric acid ($H_2SO_4$) to form what is known as crude tall oil (CTO). Crude tall oil is then distilled to provide a distillation fraction which is rich in resin acids, also referred to in the art as TOR. Thus, TOR has sulfur compounds as a result of the ($H_2SO_4$) introduced to the CTO.

Other distillation fractions of crude tall oil include tall oil fatty acid (TOFA), which is a fraction rich in fatty acids, and distilled tall oil (DTO), which is a fraction rich in a mixture of resin acids and fatty acids. Tall oil pitch is the residue of the distillation of crude tall oil and comprises alcohol esters of fatty acids and resin acids, oligomers of fatty and resin acids, phytosterols, hydrocarbons, and other components with high-boiling points.

Rosin-containing materials, including rosins, may be used as such in numerous applications, e.g., as tackifiers in adhesive applications (e.g. for tapes, labels, non-woven hygiene products and packaging), ink applications (e.g. as binders), paper sizing applications, road marking applications (e.g. as binders), tires and rubber applications (e.g. as emulsifiers, processing aids or traction resins). They may also be used as a source of rosin to obtain modified-rosin products such as hydrogenated rosin, disproportionated rosin, dimerized rosin, rosin esters, and other rosin derivatives such as salts of rosin (e.g. rosin soaps), rosin alcohols, rosin amides, rosin nitriles, rosin anhydrides, and Diels-Alder adducts of rosin.

Given their availability, CTO, TOR and DTO are attractive sources of rosin. Some of the drawbacks of rosin-containing materials such as CTO, TOR and DTO and of rosin products derived therefrom include that they tend to be dark in color, tend to darken during aging and tend to be odorous, mainly due to the presence of sulfur compounds. In particular, modified rosins derived from such rosin-containing materials generally have a Gardner color of about 6 or higher and have sulfur contents typically varying between 40 and 5000 ppm. This limits the usefulness of such products, particularly, in applications Where low color and/or low odor are of importance. The sulfur, and other impurities present in the rosin-containing materials may be held responsible for such drawbacks.

Impurities may originate directly from the source of wood used to obtain the rosin-containing materials or may be generated during the Kraft wood pulping process. In particular, sulfur compounds present in rosin-containing materials originate from the use of $Na_2S$, as well as the $H_2SO_4$, used in the process of their preparation. The sulfur compounds generally are sulfides, including dimethyl sulfide (DMS), dimethyl disulfide (DMDS), hydrogen sulfide ($H_2S$) and higher molecular weight sulfides); mercaptans, including methyl mercaptan (MM); and oxidized sulfur compounds such as sulfur oxides and sulfones, including the corresponding oxidized species of sulfides and mercaptans mentioned above.

Several methods have been described which attempt to improve the properties of products derived from crude tall oil and tall oil rosin, among which, attempts to remove sulfur compounds.

US 2005/197490 describes a process for the production of high quality fatty acids, rosin acids, and mixtures thereof from a raw material (comprising black liquor soap, crude tall oil or tall oil pitch and having less than 25% of water) by means of solvent extraction with an apolar solvent.

U.S. Pat. No. 4,507,228 describes the partial hydrogenation and sulfur reduction of tall oil rosin. Such hydrogenation processes disadvantageously result in the loss of double bonds present in resin acids and tend to provide products with a reduced acid number due to the loss of carboxyl groups by decarboxylation.

U.S. Pat. No. 4,585,584 describes tall oil rosin esters of pentaerythritol prepared in the presence of activated carbon which possess an improved, lighter color.

U.S. Pat. No. 5,543,110 describes a process for deodorizing tall oil rosin and tall oil fatty acids and their derivatives by treating same with an ammonium hydroxide solution under a steam sparge.

U.S. Pat. No. 3,655,635 describes the re-crystallization of tall oil rosin from acetone, ethanol and other organic solvents followed by treatment with the same solvents at a temperature between minus 17 and 0° C. Such re-crystallization processes suffer from significant product losses.

Even though several of the described methods appear to improve the properties of products obtained, to a certain extent, none is really satisfactory and hence there is still a need for improved methods.

We have found that a rosin-containing material comprising rosin and sulfur compounds may be purified by oxidizing at least part of the sulfur compounds without oxidizing the rosin, and separating the oxidized sulfur compounds, from rosin. The result is an improved method for the purification of rosin-containing materials from sulfur compounds, resulting in rosin containing material with low sulfur content.

One aspect of our invention relates to a method for purifying a rosin-containing material from sulfur compounds comprising: a) contacting a rosin-containing material comprising rosin and sulfur compounds with an oxidizing agent, at a temperature from 0 to 60° C. for 10 minutes to 3 hours, to oxidize at least part of the sulfur compounds; b) separating the rosin from the oxidized sulfur compounds; to obtain a purified rosin-containing material.

Such purified rosin-containing materials and rosin products derived therefrom display good properties and, in particular, they have low color and low odor. They also generally display a higher softening point and a higher glass transition temperature when compared to rosin containing-materials which have not undergone purification as described herein or their derivatives. These and other advantages of the methods and products described herein will become evident from the following description.

A rosin-containing material that may be purified according to the methods described herein is a material which comprises rosin and sulfur compounds. In particular, the rosin-containing material may be a rosin-containing fraction derived from the Kraft wood pulping process, such as, crude tall oil (CTO), tall oil rosin (TOR), and distilled tall oil (DTO). Crude tall oil and tall oil rosin may be preferred rosin-containing materials.

The sulfur compounds present in the rosin-containing material generally are sulfides, including dimethyl sulfide (DMS), dimethyl disulfide (DMDS), hydrogen sulfide ($H_2S$) and higher molecular weight sulfides); mercaptans, including methyl mercaptan (MM); and oxidized sulfur compounds such as sulfur oxides and sulfones, including the corresponding oxidized species of sulfides and mercaptans mentioned above.

Rosin typically consists of a mixture of several resin acids, and other minor components. Resin acids include C20 mono-carboxylic acids with a nucleus of three fused six-membered carbon rings which comprise double bonds that vary in number and location. Examples of resin acids include abietic acid, neoabietic acid, dehydroabietic acid, pimaric acid, levopimaric acid, sandaracopimaric acid, isopimaric acid and palustric acid. The rosin present in the rosin-containing materials, and in particular in TOR and DTO, may further contain dimerized resin acids and seco-dehydroabietic acids formed under the harsh conditions of the Kraft wood pulping process, and during the distillation of CTO.

The rosin-containing material used in a method as described herein may genera comprise from 10 wt. % to 99.99 wt. % of rosin and from 40 ppm to 5000 ppm of sulfur compounds. In particular, the rosin-containing material may comprise from 20 wt. % to 95 wt. % of rosin, more in particular from 25 wt. % to 75 wt. % and even more in particular from 30 wt. % to 60 wt. % of rosin and from 40 to 5000 ppm of sulfur compounds, in particular from 75 to 1000 ppm, more in particular from 100 ppm to 750 ppm of sulfur compounds, based on the total weight of rosin-containing material. The remaining of the rosin-containing material to 100 wt. % consists of components other than rosin and sulfur compounds, including, for instance, fatty acids (including stearic acid, oleic acid, linoleic acid, linolenic acid and pinolenic acid), high molecular weight alcohols (e.g. fatty alcohols and sterols), alkyl hydrocarbon derivates, polymerized rosin, thermally degraded rosin, oxidized rosin, decarboxylated rosin, other unsaponifiables, and trace metals.

These components may originate directly from the source of wood used to obtain the rosin-containing materials, or may be generated during the preparation of the rosin-containing materials, i.e. Kraft wood pulping process and any subsequent steps, e.g., distillation steps. The exact composition of the rosin-containing material used in a process as described herein may vary. For instance, the composition of CTO, TOR and DTO may vary depending on the starting materials and processing steps used in their production.

A crude tall oil may typically comprise from 10 to 50 wt. % of rosin, from 40 to 70 wt. % of fatty acids, and other components to a total of 100 wt. %, including, e.g., any of the additional components as described above and, in particular, high molecular weight alcohols, sterols and unsaponifiables.

A tall oil rosin may typically comprise 75-99 wt. % (in particular 80-95 wt. %) of rosin, 2-10 wt. % of fatty acids, and other components to a total of 100 wt. %, including, e.g., any of the additional components as described above and, in particular, other acids and unsaponifiables.

A distilled tall oil may typically comprise 10-40 wt. % of rosin, from 50 to 80 wt. % of fatty acids and other components to a total of 100 wt. % including, e.g., any of the additional components as described above and, in particular, unsaponifiables.

The presence of double bonds in the resin acids of rosin make them sensitive to oxidation conditions. We have found, surprisingly, that it is possible to oxidize sulfur compounds present in rosin-containing materials selectively, without oxidizing the rosin. We have accomplished this by using oxidation conditions may be used which are mild enough to avoid oxidizing the resin acids of rosin, but strong enough to oxidize at least part of the sulfur compounds present in the rosin-containing material. This may be achieved by using an oxidizing agent under mild reaction conditions. In particular, the oxidation of the sulfur compounds present in the rosin-containing material may be achieved by contacting the rosin-containing material with an oxidizing agent at a temperature from 0 to 60° C. for 10 minutes to 3 hours. At temperatures lower than 0° C. the oxidation reaction slows down or even stops whereas at temperatures higher than 60° C. rosin may start suffering from oxidation. In particular, the temperature may be from 10 to 55° C., more in particular from 20 to 50° C., even more in particular from 25 to 45° C. Generally, reaction times lower than 10 minutes do not result in a significant amount of oxidized sulfur compounds, whereas reaction times longer than 3 hours do not significantly increase the amount oxidized sulfur compounds and degradation of the rosin (in particular oxidation of the rosin) may become significant. In particular, the reaction time may be from 15 minutes to 2.5 hours, more in particular from 30 minutes to 1.5 hours, and even more in particular from 45 minutes to 1 hour.

To take advantage of the mild oxidation conditions, the rosin-containing material, as used in a method as described herein, generally is in liquid form, i.e. the rosin-containing material as such may be a liquid, here referred to as "liquid rosin-containing material," or may be dissolved or dispersed in a solvent. To facilitate the contact of the rosin-containing material with the oxidizing agent a liquid rosin-containing material or a rosin containing-material in solution may be preferred. In several embodiments CTO, which is generally a liquid, may be directly treated with the oxidizing agent or may be dissolved in a solvent. On the other hand, as TOR, which is generally a solid, is preferably dissolved in a solvent. Suitable solvents for dissolving a rosin-containing material may be selected from polar and apolar solvents such as alcohols, ethers (e.g. diethyl ether, tetrahydrofuran (THF)), monoalkyl ethers and polyalkyl ethers of polyols (e.g. monoalkyl ethers of diglycol such as 1-methoxy-2-propanol), ketones (e.g. acetone), esters, tertiary amides (e.g. N,N-dimethyl formamide (DMF) and N-methyl-2-pyrrolidone (NMP)), aliphatic hydrocarbons and aromatic hydrocarbons (e.g. hexane, benzene, toluene, xylene, and naphtha). Monoalkyl ethers of diglycol, and in particular 1-methoxy-2-propanol, may be preferred.

The oxidizing agent may be any oxidizing agent which allows the selective oxidation of sulfur compounds without oxidizing rosin. Suitable oxidizing agents include, for instance, common oxidizing agents such as inorganic or organic peroxides (e.g. hydrogen peroxide and isopropyl hydroperoxide), oxygen (e.g. oxygen from the air), ozone, halogen (e.g. chlorine and iodine), oxides (e.g. chlorine dioxide and nitrogen dioxide), percarbonic acids (e.g. performic and peracetic acid), metal salts of oxyanions and oxyacids (e.g. $NO_3^-$, $IO_3^-$, $MnO_4^-$ and $Cr_2O_7^{2-}$) and metal complexes. In particular, hydrogen peroxide and oxygen may be preferred because they do not generate potentially undesirable side-products.

The amount of the oxidizing agent may be from 1.5 to 50 wt. % based on the total amount of rosin-containing material, in particular from 2.5 to 40 wt. %, more in particular from 5 to 25 wt. %, yet more in particular from 10 to 20 wt. %.

The oxidizing agent may be in liquid form (e.g. in solution), in solid form, or may be a gas.

Using an oxidizing agent in solution may be preferred. Suitable solvents include, in addition to the solvents mentioned above for the rosin-containing materials, water and mixtures of water and a monoalkyl ether of a diglycol (e.g. a mixture of water and 1-methoxy-2-propanol). As an example, an aqueous solution of hydrogen peroxide may be mentioned.

In several embodiments, a solution of an oxidizing agent may be added to a rosin-containing material in liquid form. The solvent of the oxidizing agent may preferably be miscible with the rosin containing material. Where a solution of an oxidizing agent is added to a solution of a rosin-containing material, the solvent of the oxidizing agent and the solvent of the rosin-containing material may be the same or different. In a particular embodiment an aqueous solution of hydrogen peroxide may be added to a solution of a rosin-containing material in 1-methoxy-2-propanol.

A gas comprising an oxidizing agent may also be used. For instance the oxidizing agent may be a gas selected from, for instance, oxygen (e.g. oxygen from the air), ozone, halogen (e.g. chlorine and iodine) and oxides (e.g. nitrogen dioxide). In several embodiments the gas may be bubbled through a rosin-containing material in liquid form.

The oxidizing agent may also be added to the rosin-containing material in solid form. For instance, an oxidizing agent in powder form may be dissolved or dispersed in a rosin-containing material in liquid form. Metal complexes and metal salts of oxyanions and oxyacids may be preferably added to the rosin-containing material in solid form.

The treatment of the rosin-containing material with the oxidizing agent, under the mild conditions described herein, results in the oxidation of at least part of the sulfur compounds originally present in the rosin-containing material. Generally, oxidation of the sulfur compounds is obtained without oxidizing the rosin. Accordingly, after the treatment with the oxidizing agent the reaction mixture comprises oxidized sulfur compounds and substantially no oxidized rosin. By "now oxidized rosin" we mean that the amount of oxidized rosin in the reaction mixture is beyond the detection limits or is from 0 to 1 wt. % of the rosin present in the starting rosin-containing material, in particular from 0.0001 to 0.5 wt. %, more in particular from 0.001 to 0.1 wt. %, and even more in particular from 0.005 to 0.01 wt. %.

The oxidized sulfur compounds produced in our method include, oxidized sulfur compounds originally present in the rosin-containing material and oxidized sulfur compounds formed by the treatment of the rosin-containing material with the oxidizing agent. Accordingly, the oxidized sulfur compounds generally are sulfur oxides and sulfones, including the corresponding oxidized species of sulfides and mercaptans mentioned above, e.g. oxidized species derived from dimethyl sulfide (DMS), dimethyl disulfide (DMDS), hydrogen sulfide ($H_2S$), higher molecular weight sulfides and methyl mercaptan (MM).

The form and nature of the reaction mixture obtained may vary depending on which method is used for contacting the rosin-containing material with the oxidizing agent. That is the reaction mixture may be a one-phase, or a two-phase mixture A one-phase reaction mixture may be generally obtained by contacting a liquid rosin-containing material or a rosin-containing material in solution with, for instance, an oxidizing agent in solution in a solvent which is miscible with the rosin-containing material, with an oxidizing agent in gas form, or with an oxidizing agent in liquid form solid form which dissolves in a rosin-containing material in liquid form. Such one-phase reaction mixtures generally comprise both rosin and oxidized sulfur compounds in solution.

A two-phase reaction mixture may have two liquid phases or a solid phase and a liquid phase.

A liquid-liquid two-phase reaction mixture may be obtained by contacting a liquid rosin-containing material or a rosin-containing material in solution with, for instance, an oxidizing agent in solution in a solvent which is immiscible with the liquid rosin-containing material or rosin-containing material in solution. In particular, a solution of the rosin-containing material in a first solvent may be mixed with a solution of an oxidizing agent in a second solvent, wherein the first and second solvents are immiscible. Generally, the solubility of rosin in the first solvent is higher than the solubility of rosin in the second solvent and the solubility of the oxidized sulfur compounds in the second solvent is higher than the solubility of the oxidized sulfur compounds in the first solvent.

Suitable solvents include (but are not limited to) the solvents mentioned above when describing solutions of the rosin-containing material and the oxidizing agent. As a particular example, the solvent pair of water and an aromatic hydrocarbon (such as toluene and xylene) may be mentioned. Such liquid-liquid two-phase reaction mixtures generally comprise a first liquid phase rich in dissolved rosin and a second liquid phase rich in dissolved oxidized sulfur compounds. The first phase typically comprises from 50 to 100 wt. % of the total amount of rosin in the reaction mixture, in particular from 75 to 99 wt. %, and more in particular from 80 to 90 wt. %. The second phase typically comprises from 50 to 100 wt. % of the total amount of oxidized sulfur compounds in the reaction mixture, in particular from 75 to 99 wt. %, and more in particular from 80 to 90 wt. %.

A solid-liquid two-phase reaction mixture may be obtained by contacting a liquid rosin-containing material or a rosin-containing material in solution with, for instance, an oxidizing agent in solution in a solvent which is miscible with the rosin-containing material in liquid from or in solution but which changes the solubility of rosin. In particular, the solubility of rosin in the newly formed mixture is lower than in the original system, and, consequently, rosin precipitates out or crystallizes out. Such solid-liquid two-phase reaction mixtures generally comprise oxidized sulfur compounds in solution and rosin in solid form (e.g. in suspension or as a precipitate). In one embodiment, contacting a rosin-containing material with an oxidizing agent may comprise mixing a solution of the rosin-containing material in a first solvent with a solution of the oxidizing agent in a second solvent, wherein the first solvent and the second solvent are different and the solubility of rosin in the mixture of the first and second solvent is lower than the solubility of rosin in the first solvent to obtain a solvent mixture comprising oxidized sulfur compounds in solution and rosin in solid form. Generally, suitable solvents include the solvents mentioned above when describing solutions of the rosin-containing material and the oxidizing agent. In a particular, the first solvent may be a monoalkyl ether of a diglycol (e.g. 1-ethoxy-2-propanol), and the second solvent may be water. In a particular embodiment, the solution of the oxidizing agent in the second solvent may be a 3-40 wt. % solution of hydrogen peroxide in water.

After oxidizing the rosin-containing material, the next step in our process is to separate the purified rosin material from the oxidized sulfur compounds. Such a separation may be performed using any suitable method. Generally, methods involving a phase-separation may be preferred. In particular, the separation may comprise a liquid-liquid separation or a solid-liquid separation.

Liquid-liquid separation may be generally performed by any known or suitable methods (e.g. decantation) on a two-phase liquid-liquid solvent system comprising a first liquid phase rich in dissolved rosin and a second liquid phase rich in dissolved oxidized sulfur compounds. Such two-phase liquid-liquid system may be a reaction mixture directly obtained from an oxidation treatment of the rosin-containing material as described above. A suitable two-phase liquid-liquid solvent system may also be obtained by adding a solvent to a one-phase reaction mixture obtained from an oxidation treatment as described above. Generally, suitable solvents include the solvents mentioned above when describing solutions of the rosin-containing material and the oxidizing agent. In several embodiments, the separation may comprise mixing a one-phase reaction mixture comprising a solution of both oxidized sulfur compounds and a rosin in a, e.g., an aromatic hydrocarbon such as toluene or xylene with, e.g., water to provide a two-phase liquid-liquid solvent system.

Solid-liquid separation may be generally performed by known or suitable methods (e.g. filtration and centrifugation followed by decantation) on a two-phase system comprising, e.g., oxidized sulfur compounds in solution and rosin in solid form (e.g. as a suspension or as a precipitate). Such two phase liquid-solid system may be directly obtained from an oxidation treatment of the rosin-containing material as described above which comprises oxidized sulfur compounds in solution and rosin in solid form. A suitable two phase solid-liquid system may also be obtained by adding a solvent to a one-phase reaction mixture obtained from an oxidation treatment as described above (step a) which contains both oxidized sulfur compounds and rosin in solution. Suitable solvents are solvents that change the solubility of rosin in the reaction mixture. In particular, the solubility of rosin in the newly formed mixture is lower than in the original system and, consequently, rosin precipitates out or crystallizes out. Generally, suitable solvents include the solvents mentioned above when describing solutions of the rosin-containing material and the oxidizing agent. In one embodiment a one-phase reaction mixture comprising oxidized sulfur compounds and a rosin in solution in, e.g., 1-methoxy-2-propanol may be mixed with water to obtain a two-phase solid-liquid reaction mixture. Water may be generally added to the 1-ethoxy-2-propanol solution to make a mixture with a final weight ratio of water to 1-methoxy-2-propanol of from 35:65 to 65:35.

The separated, purified rosin-containing material may be subjected to a washing step. For instance, a separated liquid fraction that is rich in dissolved rosin may be subjected to at least one washing step. Solvents suitable for washing are solvents in which rosin has limited solubility, e.g., water or a mixture of water and 1-methoxy-2-propanol. Suitable mixtures include, for instance, mixtures of solvents may have with a weight ratio of water to 1-methoxy-2-propanol of from 35:65 to 65:35, in particular from 40:60 to 60:40, and more in particular from 45:55 to 55:45.

In one embodiment, a toluene or xylene fraction that is rich in dissolved rosin may be extracted with water by any known or suitable methods, Subsequently, the solvent of the washed liquid fraction (e.g. toluene or xylene) may be removed by, e.g., distillation. A separated solid rosin may be subjected to at least one washing step and, optionally, dried (e.g. under vacuum). Washing may be performed by re-suspending the separated rosin in solid in a solvent and mixing for, e.g., 0.5 to 6 h, more in particular for 1 to 4 h, followed by a solid-liquid separation. The washing steps may be repeated, e.g., 1 to 5 times.

The method as described herein generally precludes the need for additional steps before the purified rosin-containing materials may be used as such in numerous applications. However, if desired, the purified rosin-containing material may be further subjected to additional, separation and/or purification steps, including, for instance, treatment with activated carbon, crystallization, or distillation to, for example, obtain a product with a higher degree of purity. Such steps may be performed after the separation step or washing step as described above. A distillation step may be preferred.

In one embodiment, after the separation step or after the washing step, a crude tall oil (CTO) may be subjected to distillation step to provide, e.g., purified tall oil rosin (TOR) and/or purified distilled tall oil (DTO). Advantageously, obtaining TOR and DTO by first purifying CTO before distillation benefits the distillation process and the apparatuses used. For example, distilling a previously purified CTO may reduce damage to distillation equipment from otherwise high amounts of sulfur compounds in CTO that is not purified before distillation.

The form and nature of the purified rosin-containing material may vary depending on the nature of the starting rosin-containing material and/or the specific method steps used. For instance, the purified rosin-containing material may be a solid or a liquid. In particular, the purified rosin-containing material may have a softening point of at most 20° C. for liquid rosin-containing materials and from 20 to 200° C. for semi-solid and solid rosin-containing materials. In particular, the softening point of solid rosin-containing material may be of at least 75° C., more in particular at least 90° C., and even more at least 95° C., and generally at most 175° C., and in particular at most 160° C.

We have found, surprisingly, that the rosin-containing materials purified with a method as described herein advantageously have higher softening points than rosin-containing materials which have not undergone a purification process as described herein. Generally, the increase of softening point, tested as described below, is from 0 to 10° C., in particular from 2 to 8° C. and more in particular from 4 to 6° C. The glass transition temperature (Tg) of such purified rosin-containing materials, measured as described below, also increases within the same ranges of 0 to 10° C., in particular from 2 to 8° C. and more in particular from 4 to 6° C. compared to rosin containing materials that have not undergone such a purification process.

The softening point is measured by the Ring and Ball method (according to ASTM E28-97) whereby a sample of the purified rosin-containing material is poured into a metal ring, when still warm, and is subsequently cooled. The ring is cleaned in such a way that the resin fills the ring, a steel ball is placed resting on top of the resin. The ring and ball are placed in a bracket which is lowered into a beaker containing a solvent (e.g. water, glycerol or silicone oil depending on the expected softening point), and the solvent is heated at 5° C. per minute while being stirred. When the ball drops completely through the ring, the temperature of the solvent is recorded as the Ring & Ball softening point. The glass transition temperature (Tg) may be measured by Differential Scanning calorimetry (DSC) as known in the art.

The methods described herein advantageously have high recovery yields of rosin. In particular, the amount of purified rosin recovered may be from 50 to 100 wt. % of the total amount of rosin present in the starting rosin-containing material, in particular from 75 to 95 wt. %, and more in particular from 80 to 90 wt. %.

Our methods for purifying rosin-containing materials are generally simpler than other methods described to purify rosin-containing materials by removing sulfur, and provide desulfurized rosin-containing materials with good properties. Our methods modify rosin-containing materials that are derived from the Kraft wood pulping process to give properties that are more desirable for some applications. In particular, rosin-containing materials purified according to methods as described herein have a low sulfur content, low color, low or no odor and, as described above, higher softening points and higher glass transition temperatures.

The methods described herein reduce the amount of sulfur by weight in the rosin containing material, generally, 10 to 99 wt. %, in particular from 25 to 95 wt. %, and more in particular from 50 to 90%. The total sulfur content of a purified rosin-containing material as described may generally be from 10 to 200 ppm, in particular from 25 to 150 ppm, more in particular from 40 to 100 ppm, and even more in particular from 50 to 70 ppm. The total sulfur content may be measured according to the method ASTM D5453-05 with a sulfur analyzer, e.g., an Antek 9000 Sulfur Analyzer. A sample of the product is pyrolytically combusted into carbon dioxide and sulfur dioxide, followed by excitation of the sulfur oxide with UV radiation. The fluorescent light emission from the excited sulfur oxide is detected and the amount of sulfur is quantified.

The purified rosin-containing materials may generally have a Gardner color from 0.5 to 4.5, in particular from 0.8 to 4, more in particular from 1 to 3.5, and even more in particular from 1.5 to 3.

The Gardner color refers to the neat color as measured by using a spectrophotometer according to the method ISO 46300-2:2004. The lowest value of the Gardner color scale is 1. However, estimates of Gardner color below 1 are provided by apparatuses such as Lico200 spectrophotomers. If the rosin-containing material obtained is too viscous, instead of measuring the neat Gardner color, the color of a 1:1 solution of purified rosin-containing material in, for instance, toluene or pentane may be measured using the same method and quantified using the Gardner color scale.

In addition to new methods, describe above, for purifying rosin-containing compounds by removing sulfur compounds, our invention further relates to purified rosin-containing material that are made by such methods. For instance, the purified rosin-containing material may be a crude tall oil (CTO), a tall (TOR) or a distilled tall oil (DTO) obtained by purifying a CTO, a TOR or a DTO respectively. The purified rosin-containing material may also be a TOR and a DTO obtained by distillation of a purified CTO, as described above.

The purified rosin-containing materials obtained according to the methods described herein, which may also be referred to as desulfurized rosin, may be used to provide rosin-derived products. Such rosin-derived products include in particular, rosin esters, disproportionated rosins, hydrogenated rosins and dimerized rosins. Rosin esters may include esters of rosin and at least one of glycerol, pentaerythritol, diethylene glycol, triethylene glycol, sorbitol, neopentylglycol, trimethylolpropane, methanol, ethanol, butanol, 2-ethyl hexanol and C8-C11 alkyl alcohols and C8-C11 isoalkyl alcohols. In particular, glycerol, pentaerythritol, diethylene glycol, triethylene glycol, C8-11 isoalkyl alcohol may be chosen. In one embodiment, a mixture of glycerol, pentaerythritol, diethylene glycol and triethylene glycol rosin esters may be obtained.

Modified rosins may be obtained by subjecting a purified rosin-containing material to at least one of several reactions, such as esterification, disproportionation, hydrogenation and/or a dimerization by any known or suitable methods. Tall oil rosin may be selected as the starting rosin-containing material to provide modified rosin.

We have found, surprisingly, that we can improve the effectiveness of disproportionation and hydrogenation significantly by using purified rosin-containing materials, as described above, or their derivatives, such as rosin esters, as starting materials. By "improve the effectiveness" we mean that the amount of catalyst required for hydrogenation or disproportionation can be significantly reduced, or that less time is required to obtain the desired degree of hydrogenation or disproportionation (i.e. lower conversion times). Generally, the amount of catalyst required for such a disproportionation and hydrogenation reaction may be reduced from 2 to 15 fold, in particular from 5 to 12 fold, and more in particular from 7 to 10 fold, when compared to disproportionation and hydrogenation reactions performed on rosin-containing materials which have not undergone a purification as described herein (non-desulfurized rosin). Such catalyst reduction is significant for TOR, because TOR often competes with gum rosin as a raw material. Reducing the amount of catalyst required to hydrogenate or disproportionate TOR, as described above, means that the resulting, lowered amount of catalyst is similar or equivalent to amounts of catalysts used to hydrogenate or disproportionate a gum rosin. In addition, reducing catalyst required for a reaction can have a significant impact on costs for industrial processes which generally require high amounts of catalyst are generally required.

Purified rosin-containing materials and modified rosins obtained by the methods described herein are useful in numerous applications and, in particular, applications where low color and/or low odor are required. They may be used, for instance, as tackifiers in adhesive applications (e.g. for tapes, labels, non-woven hygiene products and packaging), ink applications (e.g. as binders), paper sizing applications, road marking applications (e.g. as binders), tires and rubber applications (e.g. as emulsifiers, processing aids or traction resins). In particular, purified rosin-containing materials and modified rosins as described herein may be compounded in, for instance, adhesive compositions, ink compositions, asphalt compositions and tires.

For instance, a method for making an adhesive composition may comprise mixing a purified rosin-containing material and/or a modified rosin as described herein with a polymer (e.g. a polyolefin obtained by the use of a metallocene catalyst, a styrenic block co-polymer, a poly-α-olefin, a ethylene vinyl acetate (EVA) co-polymer and/or an acrylic polymer), an additional tackifier (e.g. a rosin ester, a C5 hydrocarbon and/or a C9 hydrocarbon) and/or an oil (e.g. a mineral oil, a naphthenic oil and/or a paraffinic oil) or a wax. In particular, the method may comprise mixing a rosin-containing material and/or modified rosin with at least one polymer and optionally at least one additional tackifier and/or at least one oil. Suitable adhesive formulations may be found, for instance, in the Handbook of Pressure Sensitive Adhesives by Satas & Associates (ISBN 0-9637993-3-9).

A method for making an asphalt composition may comprise mixing a rosin-containing material and/or modified rosin as described herein with, e.g., bitumen and aggregate.

A method for making a tire may comprise mixing a rosin-containing material and/or modified rosin as described herein with, e.g., a rubber polymer and filler.

We have found that in addition to having good properties themselves, such as low color, low odor, higher softening points and higher glass transition temperatures, the rosin-containing materials and modified rosins as described herein also improve the properties of compositions in which they are used, such as adhesives. In particular, products or compositions comprising purified rosin-containing materials (or derivative of thereof) products result in products or compositions with lower color and with less strong odor, when compared to products or compositions comprising rosin-containing materials which have not been subjected to a purification process as described herein.

Oxidized sulfur compounds (e.g. sulfones and sulfoxides) separated from rosin by methods as described herein may also be used in numerous applications. Accordingly, the present invention also relates to a method for petrifying a rosin-containing material as described herein and re-using the separated oxidized sulfur compounds. In particular, mixtures of sulfones and sulfoxides may be suitably used in metallurgy (e.g. for rare-earth elements extraction and flotation of nonferrous and noble metals such as yttrium, niobium, tantalum, gold and others); for extraction of amino acid and derivatives thereof; for extraction of hydrofluoric acid; as antifungal and antibacterial for treating skin diseases of, e.g, farm animals, including trichophytia-ringworm (i.e. Dermatophytosis, Ringworm) and common scab scabies (i.e. Psoroptosis). They may also be used as components of herbicides and repellents. Sulfoxides may be compounded in medical formulations for treatment of for instance, the human musculoskeletal system and dimethyl sulfoxide in particular may be used as an anti-inflammatory.

The separated oxidized sulfur compounds may be subjected to, e.g., an step such as isolation, purification and/or modification, to improve their suitability to a specific application. In particular, where the sulfur compounds are obtained in solution the solvent may be removed and the isolated oxidized sulfur compounds optionally purified.

The following examples illustrate several aspects of the instant invention without being limited thereto or thereby.

EXAMPLES

Example 1: Purification of Tall Oil Rosin-Containing Material 8 kg of 1-methoxy-2-propanol was added to 5 kg of finely-ground tall oil rosin-containing material (SYLVAROS™ 85 obtained from Arizona Chemical). The tall oil rosin-containing material was a solid that had a Gardner color of 6.3 (as measured in a 1:1 solution in toluene); a softening point of 66.2° C.; a glass transition temperature of 19.7° C.; and a total amount of sulfur of 617 ppm. The rosin-containing material was stirred intensively in 1-methoxy-2-propanol in a vessel to completely dissolve the rosin. Dissolution temperature was maintained in the range from 20 to 50° C. 3 kg of an aqueous hydrogen peroxide solution (with a hydrogen peroxide concentration of 27-30%) was added to the resulting solution and stirred for 3 hours at a temperature of 25-45° C.

After the addition of the hydrogen peroxide, a light yellow suspension of rosin in the solvent mixture was obtained. The suspension was then carefully filtered by which white tall oil rosin powder (with slight tints of yellow and a light residual odor) was separated from the liquid phase (which was yellow and had a strong sulfur smell).

The resulting rosin powder was then washed with 10-11 kg of a 40:60 (wt. %) mixture of water in 1-methoxy-2-propanol by, adding the solvent mixture to the white tall oil rosin powder, stirring the resulting suspension for 3 hours and filtering. The washing was repeated 2 times with a water and 1-methoxy-2-propanol mixture with ratio of 50:50 and 60:40 respectively. A final wash with 20 kg of water was performed in the same manner by stirring for 30-50 minutes. After filtration the solid was dried in a desiccator over silica gel under vacuum for 8 hours.

The rosin was obtained as a snow-white crisp powder with no smell. The Gardner color of the powdery rosin was 2.8 as measured in a 1:1 solution in toluene. The softening point of the purified rosin-containing material was 70.4° C., the glass transition temperature was 24.5° C. and the total amount of sulfur was 75 ppm. The acid number of the purified rosin-containing material was 174 mg KOH/g.

In addition to achieving a 89% reduction of sulfur compounds, the method resulted in a purified rosin-containing material which had improved properties including a lower color, no smell, a higher softening point and higher glass transition temperature, than the non-desulfurized starting tall oil rosin.

Example 2: Preparation of a Glycerol Ester of Purified Rosin 200 g of a powdery rosin (a cid number 174 mg KOH/g) obtained according to example 1 and 0.30 g of 4,4'-thiobis (2-t-butyl-5-methylphenol) (Lowinox® TBM-6 obtained from Safic-Alcan) and 0.30 g of calcium bis[monoethyl (3,5-di-tert-butyl-4-hydroxylbenzyl)phosphonate] (Irganox® 1425 obtained from BASF) were charged to a 4 necked 500 mL flask equipped with overhead stirrer, nitrogen inlet and Dean-Stark collection vessel with cooler. The rosin was then heated under nitrogen flow to 190° C. At about 160° C. the rosin was molten and the stirrer was started. About 5 g of water was collected in the Dean-Stark. Subsequently, glycerol (22.20 g) was added at 180° C. and the esterification started. The temperature was increased from 180° C. to 250° C. at a rate of 20° C. per hour. The reaction was followed by determining the acid number. After about 10 hours at the top temperature (when the acid value was below 15 mg KOH/g) the reaction mixture was sparged with nitrogen for 30 minutes. A light colored product was obtained with an acid value of 11.5 mg KOH/g and a Ring and Ball softening point of 89.7° C.

The Gardner color measured in a 1:1 solution in toluene was 3.8. The total amount of sulfur in the glycerol ester was 127 ppm. The slight increase in sulfur content in the finished product, compared to the purified rosin being used, was caused by the use of the sulfur containing disproportionation catalyst Lowinox® TBM-6.

Typically, a glycerol ester obtained from a non-desulfurized tall oil rosin, (e.g., SYLVAROS™ 85 obtained from Arizona Chemical,) using the method as described for Example 2, has a Gardner color of 4-5 measured in 1:1 solution with toluene, a softening point around 80-85° C. and sulfur content of 500-700 ppm. A typical sulfur content for a commercial glycerol ester of rosin-containing material (e.g. SYLVALITE™ RE88F), based on non-desulfurized rosin was determined to be of 662 ppm (see Table 1).

Example 3: Preparation of a Pentaerithritol Ester of Purified Rosin 312 g of a powdery rosin acid obtained according to example 1 and 0:38 g of 4,4'-thiobis(2-t-butyl-5-methylphenol) (Lowinox® TBM-6 obtained from Safic-Alcan) and 0.38 g of calcium bis[monoethyl(3,5-di-tert-butyl-4-hydroxylbenzyl)phosphonate] (Irganox® 1425 obtained from BASF) were charged to a 4 necked 500 mL flask equipped with overhead stirrer, nitrogen inlet and Dean-Stark collection vessel with cooler. The rosin was heated under nitrogen flow to 180° C. At about 160° C. the rosin was molten. About 92 g of water was collected in the Dean-Stark. Subsequently, pentaerithritol (25.8 grams) was added at 180° C. and the esterification started. The temperature was increased from 180° C. to 270° C. at a rate of 20° C. per hour. The reaction was followed by determining the acid number. After about 4.5 hours at the top temperature (when the acid value was below 12). The reaction was steam-sparged for 30 min.

A light colored product was obtained with an acid value of 9.6 mg KOH/g and Ring and Ball softening point of 103.3° C. The Gardner color measured in a 1:1 solution in toluene was 2.0. The sulfur content was determined at 119 ppm. The slight increase in sulfur content in the finished product, compared to the purified rosin being used, was caused by the use of the sulfur containing disproportionation catalyst Lowinox® TBM-6.

Typically, a pentaerithritol ester obtained from a non-desulfurized tall oil rosin using the method as described for Example 3, has a Gardner color of 6-7, a softening point of about 100° C. and a sulfur content between 500-700 ppm. Atypical sulfur content for a commercial pentaerythritol ester of rosin-containing material (e.g. SYLVALITE™ RE100F), based on non-desulfurized rosin, was determined as 587 ppm (see Table 1).

Example 4: Disproportionation With Pd/C of Purified Rosin 200 g of a powdery rosin-containing material was obtained according to example 1 was charged to a 4 necked 500 mL flask equipped with overhead stirrer, nitrogen inlet and Dean-Stark collection vessel with cooler. Prior to heating, the flask was purged with nitrogen for 30 minutes. The rosin was then heated under nitrogen flow to about 160° C. to give a melt, after which the stirrer was started. Subsequently, the reactor was heated to 265° C. About 32 mL of water was collected in the Dean-Stark. Subsequently, a slurry of 0.06 grams of 2% palladium catalyst on carbon in 2.7 mL of a mineral oil distillation fraction with a boiling point range 260-290° C. and density 830 g/ml (Test oil 6/9 AF obtained from Halterman) was charged to the reactor. The reaction temperature was raised to 295° C. in about 1 hour.

The reaction was monitored hourly by taking samples. The degree of conversion of each sample was measured by using standard Gas Chromatographic techniques. The reaction rate was calculated based on the conversion of abietic acid and the formation of dehydroabietic acid using an internal standard.

The disproportionated product was soft; such is also the case for disproportionated rosins obtained from non-desulfurized tall oil rosins such as SYLVAROS™ 85. The product was also dark in color because the product did contain residual catalyst. Accordingly, the Gardner color and the softening point were not determined. The sulfur content was determined to be 50 ppm, which is slightly lower than the starting desulfurized rosin (71 ppm), possibly due to sulfur uptake by the palladium catalyst.

A disproportionation of non-desulfurized rosin was performed as described in Example 4 but with the difference that for the non-desulfurized rosin 7 times more catalyst was used (i.e. 0.4 grams of 2% Pd/C instead of 0.06 grams of 2% Pd/C). The sulfur content of the disproportionated product of non-desulfurized rosin was determined to be 315 ppm, which is significantly lower than the starting rosin (617 ppm), possibly due to sulfur uptake by the palladium catalyst. For the same reasons as discussed above for the disproportionated product of the desulfurized rosin, the Gardner color and softening point of the disproportionated product of the non-desulfurized rosin were not determined.

Using seven times less catalyst, the conversion rate measured for the disproportionation desulfurized rosin (rosin obtained in Example 1 with 75 ppm of total sulfur) is comparable to the conversion rate obtained for the disproportionation of non-desulfurized tall oil rosin (SYLVAROS® 85 with 617 ppm of total sulfur) using a standard amount of catalyst. This is clear evidence that the disproportionation is significantly improved when starting with desulfurized rosin obtained according to the methods as described herein.

Example 5: Hydrogenation With Pd/C of Glycerol Rosin Ester Made From Purified Rosin A glycerol rosin ester prepared as described in example 2 (softening point 87.1° C., Gardner color 3.9 measured in a 1:1 solution in toluene) was hydrogenated in a pressurized vessel using 1.5% Pd catalyst on carbon at 245° C. at 450 psi until absorption of hydrogen ceased. After 4 hours the hydrogen absorption had stopped. The time of hydrogen uptake was recorded as an indication for the reaction time. The reaction mixture was then worked up by dissolving in toluene and filtering out the catalyst. After evaporation of the toluene, the hydrogenated glycerol rosin ester obtained had a sulfur content of 64 ppm and was completely odor free.

The time of hydrogen uptake recorded for the hydrogenation of the rosin ester of example 2 (i.e. obtained from the desulfurized tall oil rosin of Example 1) is much lower than the time of hydrogen uptake recorded for the hydrogenation of glycerol rosin ester obtained from non-desulfurized tall oil rosin, which required 8½ hours of hydrogen uptake.

The properties of the hydrogenated product are also improved when starting from desulfurized tall oil rosin. The hydrogenated glycerol rosin ester obtained from non-desulfurized rosin had a sulfur content of 460 ppm, a softening point of 83.5° C. The Gardner color was 1.9 as measured in a 1:1 solution in toluene.

Example 6: Hydrogenation With Pd/C of Pentaerythritol Rosin Ester Made From Purified Rosin A pentaerythritol rosin ester prepared as described in example 3 (softening point 96.6° C., Gardner color 4.5 measured in 50:50 toluene) was hydrogenated in a pressurized vessel using 1.5% Pd catalyst on Carbon at 245° C. at 450 psi until absorption of hydrogen ceased. After 3 hours the hydrogen absorption had stopped. The time of hydrogen uptake was recorded as an indication for the reaction time. The reaction mixture was then worked up by dissolving in toluene and filtering out the catalyst. The hydrogenated pentaerythritol rosin ester had a sulfur content of 54 ppm and was completely odor free after evaporation of the toluene. The hydrogenated pentaerythritol rosin ester obtained from non-desulfurized rosin had a sulfur content of 460 ppm, a softening point of 92.1° C. The Gardner color was 3.6 as measured in a 1:1 solution in toluene.

The time of hydrogen uptake recorded for the hydrogenation of the rosin ester of example 3 (i.e. obtained from the desulfurized tall oil rosin of Example 1) is much lower than the time of hydrogen uptake recorded for the hydrogenation of pentaerythritol rosin ester obtained from non-desulfurized tall oil rosin, which required 5½ hours of hydrogen uptake.

The properties of the hydrogenated product are also improved when starting from desulfurized tall oil rosin. The hydrogenated rosin ester obtained from non-desulfurized tall oil rosin had a sulfur content of 450 ppm, a softening point of 92.1° C., and a Gardner color 3.6 as measured in a 1:1 solution in toluene.

Table 1 offers an overview of the properties of the products obtained and the processes used.

toluene (i.e. a 1:1 solution in toluene) was measured using the same method and the same spectrophotometer.

The softening point was measured by the Ring and Ball method (ASTM E28-97), whereby a sample of the products prepared is poured into a metal ring, when still warm, and is subsequently cooled. The ring is cleaned in such a way that the resin fills the ring, a steel ball is placed resting on top of the resin. The ring and ball are placed in a bracket which is lowered into a beaker containing a solvent (e.g. water, glycerol or silicone oil depending on the expected softening point), and the solvent is heated at 5° C. per minute while being stirred. When the ball drops completely through the ring, the temperature of the solvent is recorded as the Ring & Ball softening point.

The glass transition temperature was measured using a Mettler Differential Scanning calorimetric apparatus. Approximately 10 mg sample are introduced in into an aluminum DSC sample cup (Aluminum crucibles 40 μl without pin, Mettler Toledo: ME 26763). The sample cup is closed and the sample is analyzed against an empty cup on the reference part of the measurement cell on a Mettler DSC 821$^e$. Throughout the measurement a nitrogen flush of 65 ml/min. is applied. Temperature program used: heating from 25 to 200° C. at 10° C./min., cooling from 200 to −10° C. at 10° C./min., and heating from 10 to 200° C. at 10° C./min.

TABLE 1

| | Sulfur content[1] | Gardner Color[2] | Odor[3] | Softening point | Other |
|---|---|---|---|---|---|
| Non-ds-TOR (SYLVAROS™ 85) | 617 | 6.3 | ++ | 66.2° C. | n.a. |
| Ex. 1: ds-TOR | 75 | 2.8 | − | 70.4° C. | n.a. |
| Ex. 2: ds-TOR glycerol ester | 127 | 3.8 | − | 87.1° C. | n.a. |
| Comp. Ex. 2: non-ds-TOR glycerol ester | 662 | 4-5 | + | 80-85° C. | n.a. |
| Ex. 3: ds-TOR pentaerythritol ester | 119 | 2.0 | − | 103.3° C. | n.a. |
| Comp. Ex. 3: non-ds-TOR pentaerythritol ester[3] | 587 | 5-6 | + | 97-100° C. | n.a. |
| Ex. 4: ds-TOR disproportionated | 50 | Not measured | − | Not measured | Amount of catalyst: 0.06 g 2% Pd/C |
| Comp. Ex. 4: non-ds-TOR disproportionated | 315 | Not measured | + | Not measured | Amount of catalyst: 0.40 g 2% Pd/C |
| Ex. 5: ds-TOR glycerol ester hydrogenated | 64 | 1.9 | − | 83.5° C. | Hydrogen uptake: 4 h |
| Comp. Ex. 5: non-ds-TOR glycerol ester hydrogenated | 460 | 1.9 | + | 90.0° C. | Hydrogen uptake: 8½ h |
| Ex. 6: ds-TOR pentaerythritol ester hydrogenated | 54 | 3.6 | − | 92.1° C. | Hydrogen uptake: 3 h |
| Comp. Ex. 6: non-ds-TOR pentaerythritol ester hydrogenated | 450 | 5.9 | + | 96.0° C. | Hydrogen uptake: 5½ h |

[1]Sulfur content in ppm: determined with an Antek 9000 Sulfur Analyzer
[2]Gardner Color in G: measured in a 1:1 solution in toluene
[3]Odor: (−) no odor detected, (+) slight odor, (++) strong odor General Procedures The acid number was determined according to ASTM D465 using a standard titration with sodium hydroxide solution.

The neat Gardner color was measured according to the method ISO 46300-2:2004 by using a Lico200 spectrophotometer. The Gardner color of 50 wt. % product solutions in The total sulfur content was measured according to the method ASTM D5453-05 with an Antek 9000 Sulfur Analyzer as described above.

The invention claimed is:
1. A method for purifying a rosin-containing material from sulfur compounds comprising:

a) contacting a rosin-containing material comprising rosin and sulfur compounds with an oxidizing agent at a temperature from 0 to 60° C. for 10 minutes to 3 hours, to oxidize at least part of the sulfur compounds; and b) separating the rosin from the oxidized sulfur compounds;

to obtain a purified rosin-containing material, wherein the said method reduces the amount of sulfur by weight in the rosin-containing material from 10 to 99 wt. %, wherein step a) comprises mixing a solution of the rosin-containing material in a first solvent with a solution of the oxidizing agent in a second solvent wherein the first solvent and the second solvent are different and the solubility of rosin in the mixture of the first and second solvent is lower than the solubility of rosin in the first solvent, to obtain a solvent mixture containing rosin in solid form and oxidized sulfur compounds in solution, and wherein step b) comprises a solid-liquid separation of the rosin in solid form from the solvent mixture comprising the oxidized sulfur compounds in solution; and wherein step c) comprises re-suspending the separated rosin in solid form in a third solvent.

2. The method according to claim 1 wherein the rosin-containing material is a liquid rosin-containing material or is a rosin-containing material in solution.

3. The method according to claim 1 wherein the oxidizing agent is selected from inorganic or organic peroxides, ozone, halogen, oxides, percarbonic acids, metal salts of oxyanions and oxyacids and metal complexes, and in particular is selected from hydrogen peroxide and oxygen.

4. The method according to claim 3 wherein the oxidizing agent is selected from oxygen and hydrogen peroxide.

5. The method according to claim 1 wherein the amount of oxidizing agent is from 1.5 to 50 wt. % of the total amount of the rosin-containing material.

6. The method according to claim 1 wherein step b) comprises a liquid-liquid separation or a solid-liquid separation.

7. The method according to claim 1 further comprising a washing step c), wherein the washing step is performed after the separation step b).

8. The method according to claim 1, wherein the first solvent is 1-methoxy-2-propanol and the second solvent and the third solvent are independently selected from water, a mixture of water and 1-methoxy-2-propanol.

9. The method according to claim 1, wherein the solution of the oxidizing agent is a solution of hydrogen peroxide in water having a hydrogen peroxide concentration from 3 to 40%.

10. The method according to claim 2, wherein step a) comprises contacting a liquid rosin-containing material or a rosin-containing material in solution with a gas comprising an oxidizing agent.

11. The method according to claim 10, wherein the gas is air.

12. The method according to claim 7 further comprising a distillation step, wherein the distillation step is performed after the separation step b) or after the washing step c).

13. The method according to claim 1 wherein the rosin-containing material is crude tall oil (CTO), tall oil rosin (TOR) or distilled tall oil (DTO).

14. A method for preparing a modified rosin comprising:
a) purifying a rosin containing-material according to the method of any one of claims 1 to 7 or 8 to 13 to provide a purified rosin-containing material; and
b) subjecting the rosin-containing material obtained in step a) to at least one reaction selected from at least one of a esterification, a disproportionation, a hydrogenation and a dimerization;

to obtain a modified rosin.

* * * * *

UNITED STATES PATENT AND TRADEMARK OFFICE
CERTIFICATE OF CORRECTION

PATENT NO. : 9,828,526 B2
APPLICATION NO. : 14/655172
DATED : November 28, 2017
INVENTOR(S) : Evdokimov et al.

It is certified that error appears in the above-identified patent and that said Letters Patent is hereby corrected as shown below:

In the Specification

In Column 1, Line 64, Delete "Where" and insert -- where --, therefor.

In Column 3, Line 34, Delete "genera" and insert -- generally --, therefor.

In Column 6, Line 7, After "mixture" insert -- . --.

In Column 6, Line 13, After "liquid form" insert -- or in --.

In Column 6, Line 53, Delete "from" and insert -- form --, therefor.

In Column 7, Lines 5-6, Delete "(e.g. 1-ethoxy-2-propanol)" and insert -- (e.g. 1-methoxy-2-propanol) --, therefor.

In Column 7, Line 60, Delete "1-ethoxy-2-propanol" and insert -- 1-methoxy-2-propanol --, therefor.

In Column 8, Line 8, Delete "methods," and insert -- methods. --, therefor.

In Column 9, Line 61, Delete "a tall" and insert -- a tall oil rosin --, therefor.

In Column 11, Line 1, Delete "En" and insert -- In --, therefor.

In Column 11, Line 21, After "thereof)" insert -- in --.

In Column 11, Line 29, Delete "petrifying" and insert -- purifying --, therefor.

Signed and Sealed this
Third Day of April, 2018

Andrei Iancu
*Director of the United States Patent and Trademark Office*

CERTIFICATE OF CORRECTION (continued)
U.S. Pat. No. 9,828,526 B2

In Column 11, Line 42, After "of" insert -- , --.

In Column 12, Line 39, Delete "(a cid" and insert -- (acid --, therefor.